US009718421B2

(12) United States Patent
Boksebeld et al.

(10) Patent No.: US 9,718,421 B2
(45) Date of Patent: Aug. 1, 2017

(54) FENDER BRACKET OF A MOTOR VEHICLE

(71) Applicant: Compagnie Plastic Omnium, Lyons (FR)

(72) Inventors: Marcel Boksebeld, Anjou (FR); Laurent Martin, Peaugres (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 14/437,746

(22) PCT Filed: Oct. 25, 2013

(86) PCT No.: PCT/FR2013/052550
§ 371 (c)(1),
(2) Date: Apr. 22, 2015

(87) PCT Pub. No.: WO2014/064394
PCT Pub. Date: May 1, 2014

(65) Prior Publication Data
US 2015/0251614 A1    Sep. 10, 2015

(30) Foreign Application Priority Data
Oct. 26, 2012   (FR) .................................. 12 60270

(51) Int. Cl.
*B62D 25/12*    (2006.01)
*B60R 19/24*    (2006.01)
*B62D 25/10*    (2006.01)
*B62D 25/16*    (2006.01)
*B60R 19/03*    (2006.01)
*B60R 19/48*    (2006.01)

(52) U.S. Cl.
CPC .............. *B60R 19/24* (2013.01); *B60R 19/03* (2013.01); *B60R 19/48* (2013.01); *B62D 25/105* (2013.01); *B62D 25/12* (2013.01); *B62D 25/163* (2013.01); *B60R 2019/247* (2013.01); *Y10T 29/49622* (2015.01)

(58) Field of Classification Search
CPC ........ B62D 25/10; B62D 25/16; B60R 19/04; E05F 5/02; E05F 5/022
USPC ............................................. 296/198, 193.11
See application file for complete search history.

(56) References Cited

U.S. PATENT DOCUMENTS 6,805,400 B2    10/2004  Bruderick et al.
7,828,369 B2 *  11/2010  Martin .................... B29C 43/36
                                               296/187.03

(Continued)

FOREIGN PATENT DOCUMENTS

DE    102009058127 A1    6/2011
EP        2657108 A1    10/2013

(Continued)

*Primary Examiner* — H Gutman
(74) *Attorney, Agent, or Firm* — Jacox, Meckstroth & Jenkins

(57) ABSTRACT

A fender bracket of a motor vehicle, which includes seatings for attaching a fender, a point for anchoring with a structural element of the vehicle, and an area for attaching a hinge of the bonnet, the area for attaching the hinge being separated from the anchoring point, and the attachment seatings and the attachment area being shaped such as to ensure a predetermined relative positioning between the fender and the bonnet.

19 Claims, 3 Drawing Sheets

(56) References Cited

U.S. PATENT DOCUMENTS

| | | | |
|---|---|---|---|
| 7,828,374 B2 * | 11/2010 | Rinderlin | B60R 21/34 |
| | | | 296/198 |
| 8,905,465 B2 | 12/2014 | Landholm et al. | |
| 2004/0108753 A1 | 6/2004 | Bruderick et al. | |
| 2005/0046237 A1 * | 3/2005 | Miyoshi | B62D 25/082 |
| | | | 296/203.02 |
| 2010/0270829 A1 * | 10/2010 | Furumoto | B62D 25/12 |
| | | | 296/193.11 |
| 2013/0285415 A1 | 10/2013 | Landholm et al. | |

FOREIGN PATENT DOCUMENTS

| | | | | |
|---|---|---|---|---|
| FR | 2917769 A1 | | 12/2008 | |
| FR | WO 2011055060 A1 * | | 5/2011 | B62D 25/12 |
| SE | EP 2657108 A1 * | | 10/2013 | B62D 25/163 |

* cited by examiner

FENDER BRACKET OF A MOTOR VEHICLE

CROSS-REFERENCE TO RELATED APPLICATIONS

This application is the U.S. National Phase application of PCT Application No. PCT/FR2013/052550 filed Oct. 25, 2013, which claims priority to the French application 1260270 filed on Oct. 26, 2012, which applications are incorporated herein by reference and made a part hereof.

BACKGROUND OF THE INVENTION

1. Field of the Invention

This invention relates to a fender bracket of a motor vehicle. The invention applies more particularly to an area of the fender bracket for attaching the bonnet hinge.

2. Description of the Related Art

Generally, the bonnet hinge is attached by fastening means to a structural element of the vehicle such as the chassis or the side sills. In the prior art, when a fender bracket is used, it is generally attached to the vehicle structure independently of the bonnet hinge. This assembly method is relatively difficult due in particular to the operations involved in blocking the body parts which require the use of jigs. In addition, the geometric complexity of the bodywork requires successive steps to adjust clearances and align the bonnet, fenders, and vehicle structure.

To address these difficulties, patent FR 2 917 769 proposes a fender bracket which is attached to the vehicle bonnet hinge which is itself attached to a structural element of the vehicle. This improves the positioning of the bodywork parts and their attachment operations, but does not provide a satisfactory solution for adjustment of the clearances between the bonnet and the fender. The bonnet hinge is in fact attached relative to the vehicle structure, also known as the frame, while the upper part of the fender, whose edge must be flush with the edge of the bonnet, is attached to the fender bracket. Due to these differences of attachment points, numerous adjustments and indexing steps are required in order to ensure correct positioning of the bodywork parts relative to each other.

SUMMARY OF THE INVENTION

The purpose of this invention is to solve the above problems by providing a bonnet hinge which is attached like the upper part of the fender, i.e. to the fender bracket only. Thus, only the fender bracket acts as reference when adjusting the clearances and alignments of the bodywork parts. This objective is achieved by a fender bracket of a motor vehicle which includes seatings for attaching a fender, a point for anchoring with a structural element of the vehicle, and an area for attaching a bonnet hinge, characterized in that the area for attaching the hinge is separated from the anchoring point, and in that the attachment seatings and the attachment area are shaped such as to ensure a predetermined relative positioning between the fender and the bonnet.

Advantageously, the fender bracket is made of a polymer material and preferably in a thermosetting polymeric material of type AMC or BMC.

Thus, the bonnet hinge and the fender are both attached directly on the fender bracket, which means that they have the same reference and which allows easy and highly accurate adjustment of the clearances and alignment between these two bodywork parts.

Preferably, the distance between the hinge attachment area and the anchoring point is greater than 50 mm, more preferably greater than 10 mm.

Preferably, the fender bracket is adapted to receive a reinforcement comprising a first attachment surface designed so that it can be attached by fastening means to the hinge attachment area and a second attachment surface designed so that it can be attached by fastening means to a structural element of the vehicle and a connection between these two attachment surfaces capable of withstanding a force of between 4000 N and 8000 N.

This reinforcement makes the bonnet hinge attachment very strong, which is essential in the event of vehicle collision. This reinforcement therefore guarantees passenger safety with respect to the possibility of the bonnet being torn off the structure.

In one embodiment of the invention, the reinforcement is shaped so that:

the first attachment surface of the reinforcement coincides with the anchoring point of the fender bracket, the second attachment surface of the reinforcement coincides with the hinge attachment area, such that after attachment, the bonnet hinge is held securely to the structural element of the vehicle by the reinforcement.

Thus, the reinforcement creates an extremely strong connection between the hinge attachment area and a structural element, which means that the hinge can be attached to the attachment area provided for this purpose on the fender bracket.

In another embodiment of the invention, the connection is conformed as a plane inclined relative to the attachment surfaces.

Advantageously, this conformation as inclined plane simplifies the height adjustment (in the Z direction) of the bodywork parts relative to each other.

In another embodiment of the invention, the reinforcement is made of a metallic material. This increases increased strength of the fender bracket reinforcement.

In another embodiment, the mean thickness of the reinforcement is generally between 0.7 mm and 3 mm.

Advantageously, the thickness of the reinforcement can be chosen to adapt the strength according to the vehicle characteristics and the desired level of safety.

In a particular embodiment of the invention, the bracket comprises pins for positioning the reinforcement. This means that the reinforcement is easy to position on the fender bracket and no longer needs to be held when assembling the fender bracket on the vehicle structure.

The invention also relates to a method for attaching a bonnet hinge to a structural element of a motor vehicle, comprising the following steps:

attachment of a motor vehicle fender bracket according to one of the preceding claims on the structural element, attachment of the bonnet hinge on the fender bracket.

These and other objects and advantages of the invention will be apparent from the following description, the accompanying drawings and the appended claims.

BRIEF DESCRIPTION OF THE ACCOMPANYING DRAWINGS

The invention will be better understood on reading the following description, given as an example only and with reference to the accompanying drawings in which.

DETAILED DESCRIPTION OF THE PREFERRED EMBODIMENTS

Figure 1:
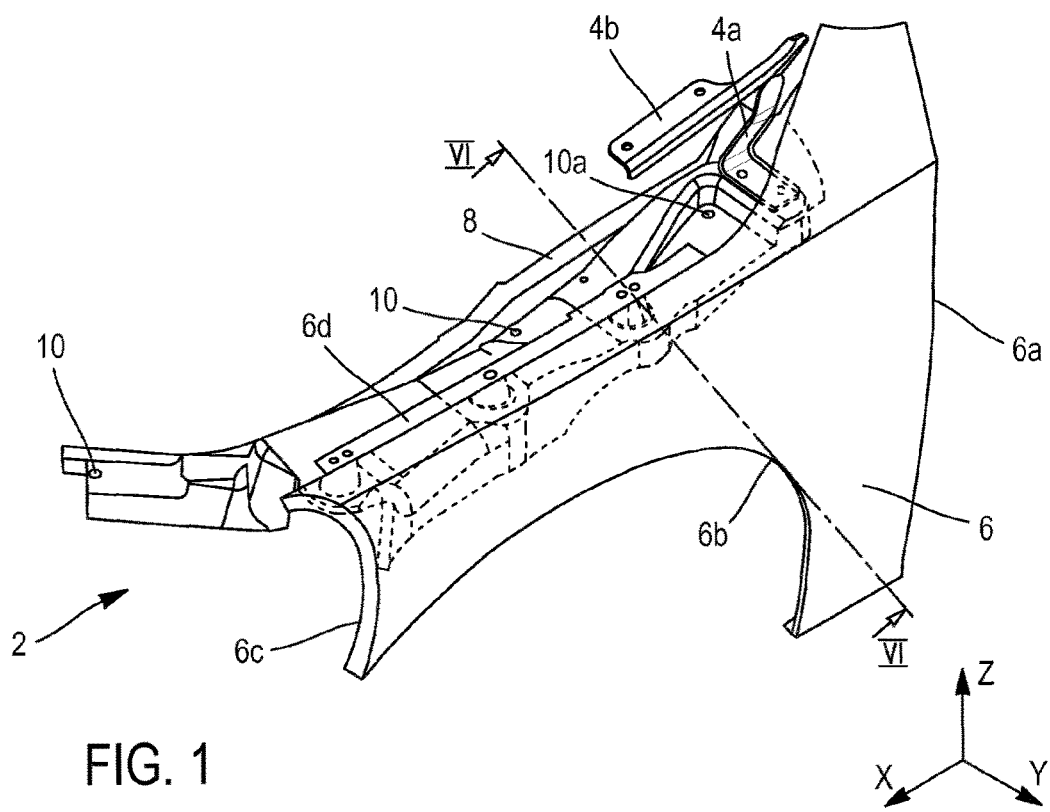
FIG. 1 is a perspective view of a fender bracket according to one embodiment, supporting a fender and a bonnet hinge, and assembled on a bodywork part.
Figure 2:
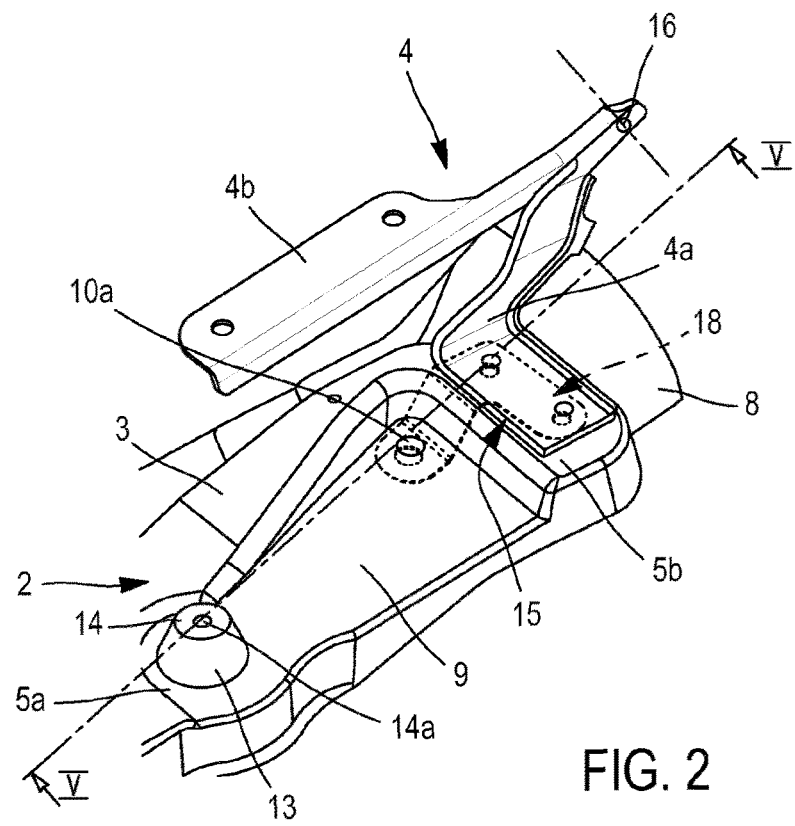
FIG. 2 is a close-up view of FIG. 1.

Referring to FIGS. 1 and 2, a fender bracket 2 supports a bonnet hinge 4 and a fender 6. The fender bracket 2, which has a shape in volume generally elongated in the longitudinal direction of the vehicle, is made from a plastic sheet of average thickness 3 mm. It is not essential, according to the invention, that the material should be provided in sheet form. Technologies such as the molding of thermosetting polymers by compression, including AMC and BMC (see below) in particular would be appropriate. The fender bracket 2 is attached to a structural element 8 (or frame) of the vehicle, sometimes called upper side sill 8 (and designated as such in the remainder of the description). This upper side sill 8 has a substantially elongated shape which defines that of the fender bracket 2. It extends laterally at the front of the vehicle and it is the most rigid part of the upper front side of the vehicle, located above of the wheel.

In order to attach the fender bracket 2 on the side sill 8, the fender bracket 2 is provided with three through holes (10, 10a), distributed longitudinally on the fender bracket 2, the holes (10, 10a) being adapted to receive fastening means (not shown) such as screws. The fender bracket 2 has two levels, a first level 5a which extends from the front to a central part of the fender bracket 2 and a second level 5b which extends to the rear, i.e. in the part closest to the vehicle passenger compartment. The two levels 5a, 5b are connected to each other by an inclined plane 3.

The upper surface of the fender bracket 2 forms a recess 9 which is elongated in the direction of the fender bracket 2 and extends the first level 5a backwards. This recess 9 protrudes towards the underneath of the fender bracket 2 and helps stiffen the rear part of the fender bracket 2.

Figure 5:
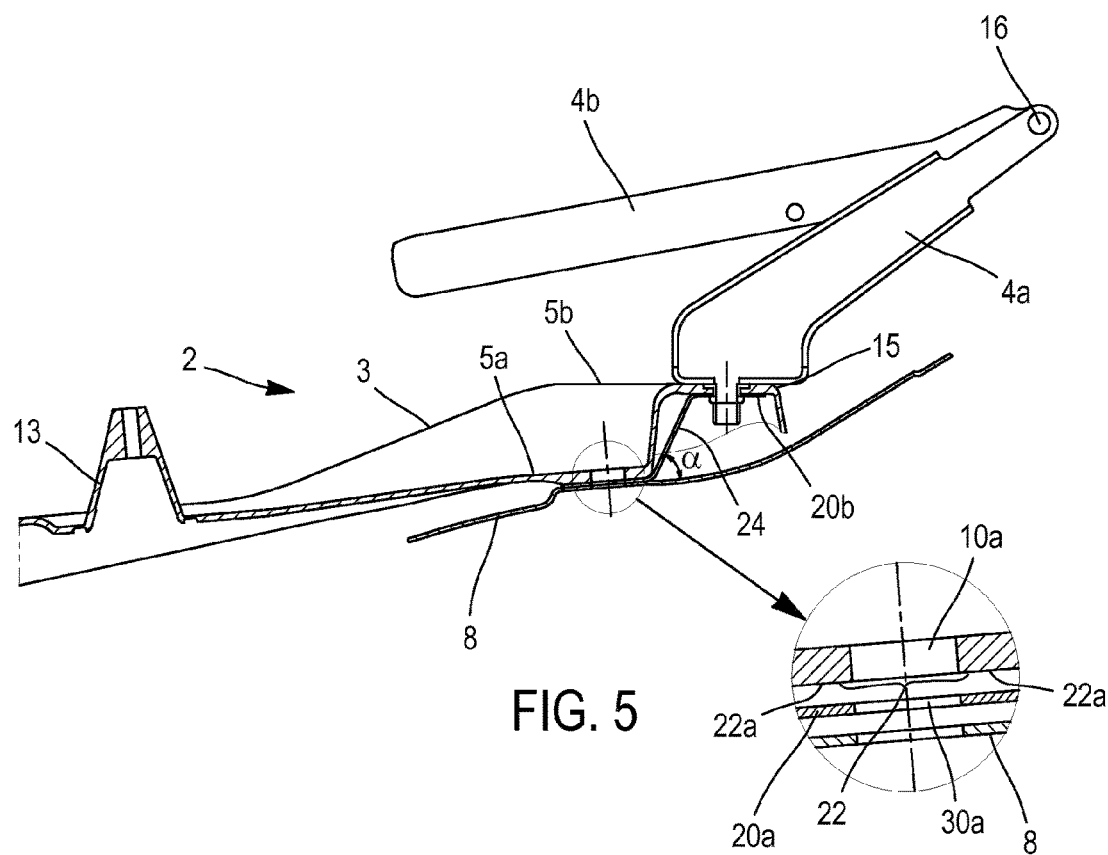
FIG. 5 is a sectional view along V-V of FIG. 2.

The sectional view of FIG. 5 shows that this recess 9 defines an anchoring area 22 which consists of contact areas or surfaces 22a and a hole 10a. When the fender bracket 2 is mounted, the hole 10a coincides with a hole in the upper side sill 8 of the vehicle frame. The top of the rear part of the fender bracket 2 has contact or attachment area 15 for attaching the bonnet hinge 4.

The fender 6 which is received in its upper part by the fender bracket 2 has a profile of shape adapted to hide the front side part of the vehicle. To attach it to the fender bracket 2, it has a rear edge 6a which is flush with a front edge of a front door of the vehicle (not shown), a lower edge 6b in an arc of a circle forming an edge for the wheel arch and a front edge 6c. Lastly, the fender 6 has an upper edge 6d which is flush with the side edge of a bonnet 7 so as to leave a clearance as precise and as controlled as possible. Towards the rear, i.e. near the passenger compartment or the windscreen, the upper edge 6d rises to join the bottom of the vehicle windscreen pillar.

Figure 6:
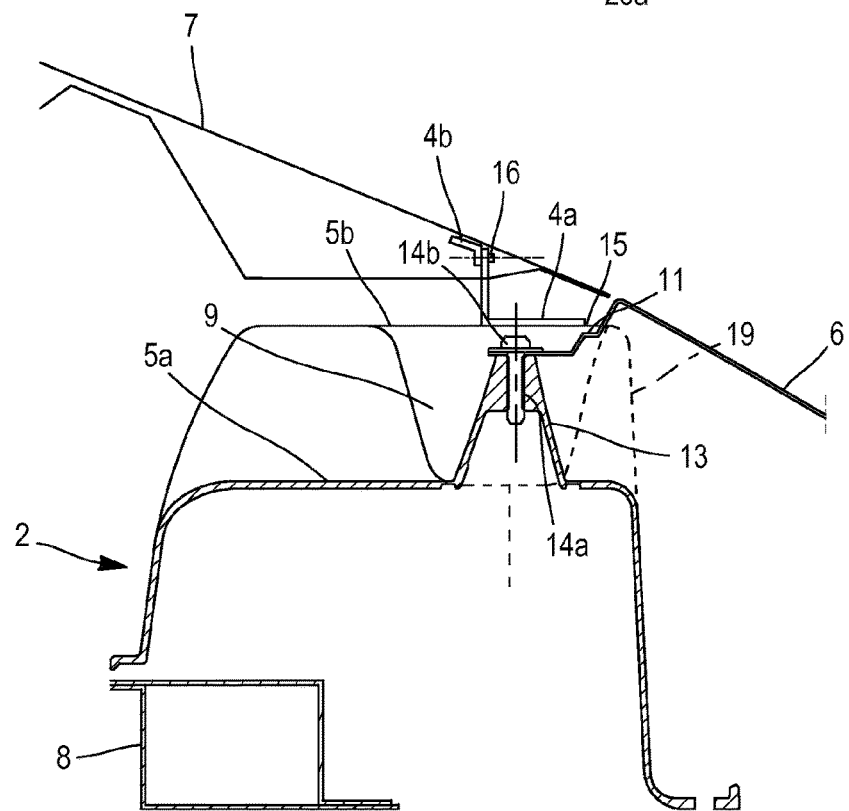
FIG. 6 is a sectional view along line VI-VI of FIG. 1 once the fender bracket has been assembled.

FIG. 6 shows that the profile of the top of the fender 6 forms a turned-over edge 11 which extends in the longitudinal direction of the fender bracket 2. This turned-over edge 11 rests on the bump stops 13 integral with the fender bracket 2.

The bump stops 13 have a substantially conical shape (but may have other shapes, including rectangular, cylindrical, cubic, etc.) and the surface of each of their vertices forms a seating 14 having at least one hole 14a able to receive a screw 14b to attach the fender 6 to the fender bracket 2. These bump stops 13 are shock absorbers whose role is to soften the impact of the head of a pedestrian on the vehicle bonnet 7 or fender 6 in case of a collision. The seatings 14 can also be defined directly on surfaces of the fender bracket 2, if, for example, the vehicle should not have bump stops 13.

The bonnet hinge 4 is made in two parts, a first fixed part called the fixed knuckle 4a, which is attached to the attachment area 15 of the fender bracket 2 and a second part called the mobile knuckle 4b which is mobile and to which the bonnet 7 can be attached. Thus, like the fender 6, the bonnet hinge 4 is attached directly to the fender bracket 2 at the contact or attachment area 15. The mobile knuckle 4b and the fixed knuckle 4a can move relative to each other about a pin 16 which allows rotation in the transverse direction Y to open the bonnet 7. Thus, with a single reference relative to the fender bracket 2 and due to the fact that the hinge 4 is not attached directly to the side sill 8, these bodywork parts are positioned precisely relative to each other. In other words, the fender bracket 2 is designed to provide a predetermined relative positioning between the attachment seatings 14 and the attachment area 15.

Figure 3:
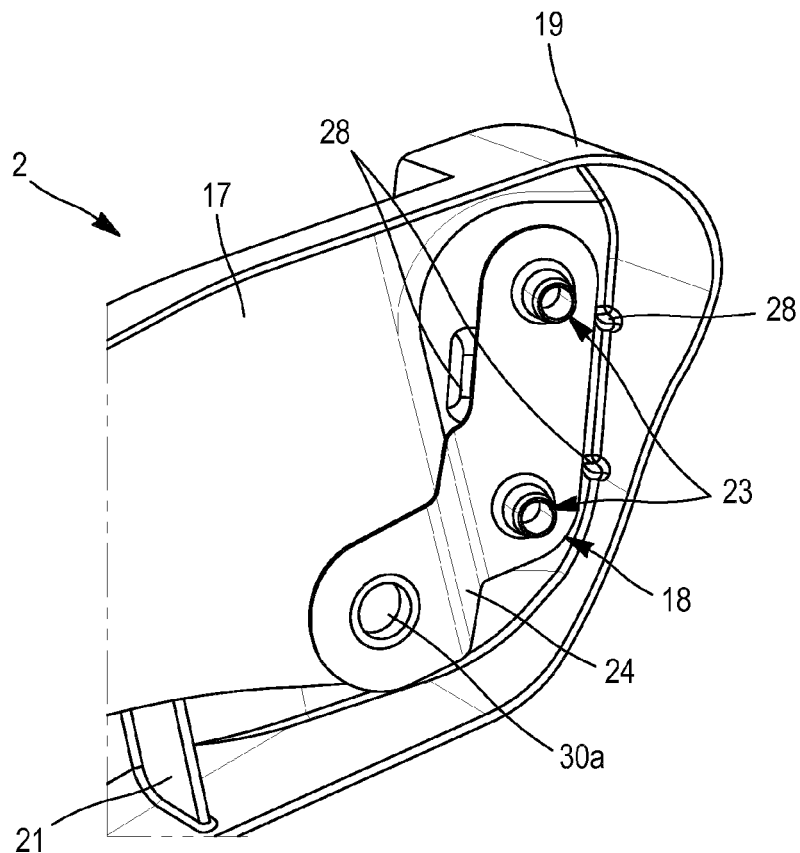
FIG. 3 is a partial perspective view from below of the fender bracket with its reinforcement.

FIG. 3 shows the underneath of the fender bracket 2 in the region of the hole 10a. The fender bracket 2 comprises a peripheral edge 19 which defines a hollow 17 housing a reinforcement 18. In the hollow 17, the fender bracket 2 comprises positioning means consisting of pins 28 which are located on the periphery of the reinforcement 18 on the fender bracket 2. Thus, the pins 28 allow prepositioning of the reinforcement 18 on the fender bracket 2. Inside the hollow 17, the recess 9 comprises a transverse rib 21 which is located on each side of the recess 9 and extends to the edge 19 of the fender bracket 2. This latter is therefore stiffened by the rib 21, by the recess 9 and by the edge 19 defining its periphery.

Figure 4:
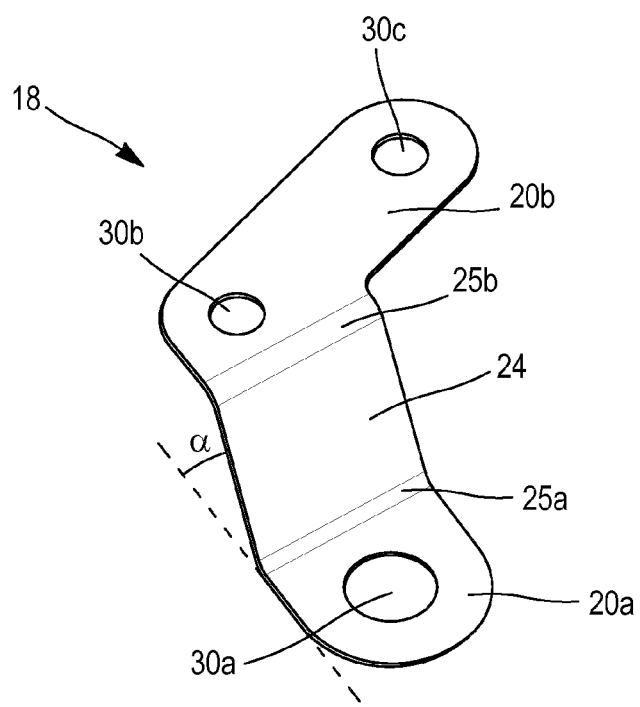
FIG. 4 is a perspective view of the reinforcement of FIG. 3.

Referring to FIG. 4, the reinforcement 18 has the appearance of a short metal strip whose profile is similar to that of a T. The reinforcement comprises two folds (25a, 25b) which define the start of two flat attachment surfaces (20a, 20b) connected by a connection 24. They rest respectively on the underneath of the recess 9 and on the underneath of the rear part of the fender bracket 2. Each attachment surface (20a, 20b) comprises one or more holes (30a, 30b, 30c) which are adapted to receive fastening means 23 such as screws/nuts, as shown in FIG. 3.

The connection 24 forms an angle a with the side sill 8 on which the reinforcement 18 is positioned. The value of this angle a is preferably between 0° and 80°, in order to obtain sufficient flexibility to assemble the fender bracket 2 which imposes its geometry and rigidity on the reinforcement 18 when tightening the fastening means 23. Ideally, the reinforcement 18 is made of metal, so that, due to the electrical continuity between the bonnet 7 and the structure, paint can be applied using an electrostatic process. The strength of the connection 24 between the two attachment surfaces (20a, 20b) is between 4000 N and 8000 N. The bonnet hinge 4 is therefore connected by the fastening means 23 and the reinforcement 18 to one of the most rigid structural parts of the front of the vehicle, i.e. the side sill 8. This guarantees optimum safety for passengers regarding a possible risk of the bonnet 7 being torn off the vehicle in the event of a collision.

The enlarged portion of FIG. 5 shows the first attachment surface 20a resting against the anchoring area 22 of the fender bracket 2 which is intended to be attached to the side sill 8 of the vehicle.

FIG. 5 also shows the second attachment surface 20b which rests against the lower side of the fender bracket 2, at the upper side of the fender bracket 2, itself forming the attachment area 15 of the hinge 4. A set of screws and nuts or fastening means 23 passes through the holes (30b, 30c) of the reinforcement 18, fastening together the surface 20b, the attachment area 15 of the fixed knuckle 4a and the bonnet hinge 4. In the embodiment described, the anchoring area 22 comprises a contact surface 22a and a hole 10a adapted to receive a screw/nut pair (not shown).

The anchoring area 22 can be used to position the fender bracket 2 relative to the structure or side sill 8 of the vehicle by means of a set of screws and nuts (not shown) received in the through hole 30a of the reinforcement 18. Since the attachment area 15 of the hinge 4 is behind the fender bracket 2 on the second level 5b, it is separated from the anchoring area 22 of the fender bracket 2. Within the scope of the invention, the separation distance should be at least greater than 10 mm, and preferably less than 100 mm, and more preferably less than 150 mm. Thus, these separation distance ranges advantageously correspond to most current vehicles.

The fender bracket 2 is generally made by injection of a thermosetting polymer material of type AMC (Advanced Molding Compound) or BMC (Bulk Molding Compound), for example. The hinge 4 of the bonnet 7 is generally made from relatively thick metal sheet in order to support the bonnet 7 and provide resistance in case of impact.

An assembly method is used to attach the movable knuckle 4b and the top of the fender 6 to the fender bracket 2, thereby allowing them to have the same reference. In a first step, the fender bracket 2 to which the reinforcement 18 is assembled is attached to the vehicle structure, especially at the anchoring area 22, being positioned relative to the longitudinal X and transverse Y directions of the vehicle. The bonnet hinge 4 is then attached by fastening means at the attachment area 15 and the fender 6 is attached to the fender bracket 2 at the bump stops 13 by screws which pass through the holes 10a, 10b, so that the screws are tightened against the seatings 14 which are on the bump stops 13. The fender bracket 2 therefore imposes the rigidity of its geometry on the reinforcement 18 which, due to its flexibility, significantly improves the adjustment of clearances and alignments between the bonnet 7 and the fender 6.

Various adaptations and variants to the fender bracket 2 described above are also possible. For example, the shape and arrangement of the attachment areas of the hinge 4 on the fender bracket 2 may be modified, in particular depending on the geometry of the vehicle, in particular of its structural elements.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A fender bracket of a motor vehicle, which includes attachment seatings for attaching a fender, an anchoring point for anchoring with a structural element of the motor vehicle, and a hinge attachment area for attaching a bonnet hinge of a bonnet, wherein said fender bracket comprises a reinforcement comprising a first attachment surface designed to be attached by fastening means to said hinge attachment area and a second attachment surface designed to be attached by fastening means to said structural element of the motor vehicle and in that said hinge attachment area for attaching said hinge is separated from said anchoring point and said fender bracket is shaped so as to ensure a predetermined relative positioning between said attachment seatings and said hinge attachment area and comprising a connection between said first attachment surface and said second attachment surface, said connection being conformed as a plane inclined relative to said first attachment surface and said second attachment surface, wherein said reinforcement having a mean thickness of between 0.7 mm and 3 mm.

2. The fender bracket according to claim 1, wherein said fender bracket is made of a polymer material.

3. The fender bracket according to claim 2, wherein said reinforcement being conformed so that:
said first attachment surface of said reinforcement coincides with said anchoring point of said fender bracket,
said second attachment surface of said reinforcement coincides with said hinge attachment area of said hinge,
such that after attachment, said bonnet hinge is held securely to said structural element of the motor vehicle by said reinforcement.

4. The fender bracket according to claim 2, comprising a connection between said first attachment surface and said second attachment surface capable of withstanding a force of between 4000 N and 8000 N.

5. The fender bracket according to claim 2, said reinforcement is made of a metallic material.

6. The fender bracket according to claim 2, wherein said polymer material is a thermosetting polymeric material of type AMC or BMC.

7. The fender bracket according to claim 1, wherein said reinforcement being conformed so that:
said first attachment surface of said reinforcement coincides with said anchoring point of said fender bracket,
said second attachment surface of said reinforcement coincides with said hinge attachment area of said hinge,
such that after attachment, said bonnet hinge is held securely to said structural element of the motor vehicle by said reinforcement.

8. The fender bracket according to claim 7, comprising a connection between said first attachment surface and said second attachment surface capable of withstanding a force of between 4000 N and 8000 N.

9. The fender bracket according to claim 7, said reinforcement is made of a metallic material.

10. A method for attaching a bonnet hinge to a structural element of a motor vehicle, comprising the following steps:
attachment of said fender bracket of a motor vehicle according to claim 7 on said structural element,
attachment of said bonnet hinge on said fender bracket.

11. The fender bracket according to claim 1, comprising a connection between said first attachment surface and said second attachment surface capable of withstanding a force of between 4000 N and 8000 N.

12. The fender bracket according to claim 11, said reinforcement is made of a metallic material.

13. The fender bracket according to claim 11, wherein said reinforcement being conformed so that:

said first attachment surface of said reinforcement coincides with said anchoring point of said fender bracket, said second attachment surface of said reinforcement coincides with said hinge attachment area of said hinge, such that after attachment, said bonnet hinge is held securely to said structural element of the motor vehicle by said reinforcement.

14. The fender bracket according to claim 1, said reinforcement is made of a metallic material.

15. A method for attaching a bonnet hinge to a structural element of a motor vehicle, comprising the following steps:

attachment of said fender bracket of a motor vehicle according to claim 1 on said structural element, attachment of said bonnet hinge on said fender bracket.

16. The fender bracket according to claim 1, said reinforcement is made of a metallic material.

17. A fender bracket of a motor vehicle, which includes attachment seatings for attaching a fender, an anchoring point for anchoring with a structural element of the motor vehicle, and a hinge attachment area for attaching a bonnet hinge of a bonnet, wherein said fender bracket comprises a reinforcement comprising a first attachment surface designed to be attached by fastening means to said hinge attachment area and a second attachment surface designed to be attached by fastening means to said structural element of the motor vehicle and in that said hinge attachment area for attaching said hinge is separated from said anchoring point and said fender bracket is shaped so as to ensure a predetermined relative positioning between said attachment seatings and said hinge attachment area;

said fender bracket comprising pins for positioning said reinforcement.

18. A fender bracket of a motor vehicle, which includes attachment seatings for attaching a fender, an anchoring point for anchoring with a structural element of the motor vehicle, and a hinge attachment area for attaching a bonnet hinge of a bonnet, wherein said fender bracket comprises a reinforcement comprising a first attachment surface designed to be attached by fastening means to said hinge attachment area and a second attachment surface designed to be attached by fastening means to said structural element of the motor vehicle and in that said hinge attachment area for attaching said hinge is separated from said anchoring point and said fender bracket is shaped so as to ensure a predetermined relative positioning between said attachment seatings and said hinge attachment area;

wherein said fender bracket is made of a polymer material;

said fender bracket comprising pins for positioning said reinforcement.

19. The fender bracket according to claim 18, wherein said polymer material is a thermosetting polymeric material of type AMC or BMC.

* * * * *

UNITED STATES PATENT AND TRADEMARK OFFICE
CERTIFICATE OF CORRECTION

| | | |
|---|---|---|
| PATENT NO. | : 9,718,421 B2 | Page 1 of 1 |
| APPLICATION NO. | : 14/437746 | |
| DATED | : August 1, 2017 | |
| INVENTOR(S) | : Marcel Boksebeld et al. | |

It is certified that error appears in the above-identified patent and that said Letters Patent is hereby corrected as shown below:

On the Title Page

Item (71) Applicant, delete "Lyons" and insert --Lyon-- therefor.
Item (73) Assignee, delete "Lyons" and insert --Lyon-- therefor.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*